US007890101B2

(12) United States Patent
Yamakawa et al.

(10) Patent No.: US 7,890,101 B2
(45) Date of Patent: Feb. 15, 2011

(54) CALL CONTROLLING APPARATUS, CALL CONTROLLING METHOD, AND COMPUTER PROGRAM

(75) Inventors: Keiichiro Yamakawa, Kawasaki (JP); Takashi Mitsuhashi, Kawasaki (JP); Yuji Tajima, Kawasaki (JP); Takehito Tsurumi, Kawasaki (JP); Takashi Kitano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1168 days.

(21) Appl. No.: 11/438,239

(22) Filed: May 22, 2006

(65) Prior Publication Data
US 2007/0191004 A1 Aug. 16, 2007

(30) Foreign Application Priority Data
Feb. 14, 2006 (JP) .............................. 2006-037220

(51) Int. Cl.
*H04W 4/00* (2009.01)
(52) U.S. Cl. ................. 455/433; 455/432.1; 455/432.2; 455/435.1; 455/424; 370/338; 370/352; 370/389; 370/392; 370/395.2; 709/223; 709/225; 709/228; 709/229; 709/230; 719/311; 719/328
(58) Field of Classification Search ................. 455/433, 455/432.1, 432.2, 424, 425, 435.1; 370/352, 370/389, 466, 474, 338, 352–356, 389, 390, 370/466, 474, 328; 709/203, 223, 225, 226, 709/227, 228, 229, 230, 245, 246; 719/311, 719/328
See application file for complete search history.

(56) References Cited

U.S. PATENT DOCUMENTS 7,028,311 B2 * 4/2006 Roach et al. ................. 719/328

7,177,642 B2 * 2/2007 Sanchez Herrero et al. ...... 455/435.1
2005/0073361 A1 4/2005 Hamada et al.
2006/0092970 A1 * 5/2006 Song et al. ................... 370/466
2006/0176876 A1 * 8/2006 Aborn et al. .................. 370/352

FOREIGN PATENT DOCUMENTS

JP 2005-515712 A 5/2005
WO WO-2003/061236 A1 7/2003

OTHER PUBLICATIONS

"3GPP TS 23.228 V7.2.0" Dec. 2005 http://www.3gpp.org/ftp/Specs/html-info/23228.htm.
[JPO] Japan Patent Office; Office Action mailed Sep. 21, 2010, in connection with correspondent application 2006-037220; partial English-language translation.

(Continued)

*Primary Examiner*—Charles N Appiah
*Assistant Examiner*—Olumide T Ajibade Akonai
(74) *Attorney, Agent, or Firm*—Fujitsu Patent Center

(57) ABSTRACT

An I-CSCF and an S-CSCF are included in a single call controlling apparatus. A message from a terminal directed to one of a plurality of degenerate-call controlling apparatuses. The I-CSCF in that apparatus receives the message and forwards the message to an S-CSCF that serves as the storing destination, which is specified for each subscriber in advance. The I-CSCF is configured to receive a message that has been forwarded from the same call controlling apparatus or another call controlling apparatus and to control sessions of the terminal based on the received messages.

10 Claims, 6 Drawing Sheets

OTHER PUBLICATIONS

Yamada, Shigeki et al., "Environment-Adaptive Personal Communication (EAPEC) Architecture for Ubiquitous Computing Networks," Technical Report of the Institute of Electronics, Information and Communication Engineers (Tech. Report of IEICE), SSE2000-286, IN2000-242, Mar. 2, 2001, P367-374 (12 pages total); partial English-language translation of section 4.2.

* cited by examiner

CALL CONTROLLING APPARATUS, CALL CONTROLLING METHOD, AND COMPUTER PROGRAM

BACKGROUND OF THE INVENTION

1. Field of the Invention

The present invention relates to a technology for controlling a call based on a signal transmitted from a terminal in a mobile communication network.

2. Description of the Related Art

In recent years, the 3rd Generation Partnership Project (3GPP), which is a group for standardizing the third generation mobile communication systems, has been working on the standardization of the IP Multimedia Subsystem (IMS). The IMS is a specification for communication to change the services that have been so far used in the fixed networks and the mobile communication and the broadcast systems into Internet Protocol-based (IP-based) services so that integrated multimedia services can be offered (See "3GPP TS 23. 228V7. 2. 0, searched on Dec. 26, 2005 on the Internet <URL: http://www.3gpp.org/ftp/Specs/html-info/23228.htm>).

FIG. 6 is a block diagram of a typical mobile communication network defined by the IMS. The mobile communication network includes n (where n is a positive integer) terminals $10_1$ to $10_n$, such as mobile phones, and n application servers $20_1$ to $2_n$. Subscribers to the network service (hereinafter, "subscribers") use the terminals $10_1$ to $10_n$ to enjoy various kinds of multimedia services including telephone call services that are offered by the communication carrier through the application servers $20_1$ to $20_n$. When the subscribers use those services, sessions are established via the three types of Session Initiation Protocol (SIP) servers, namely Proxy Call Session Control Functions (P-CSCFs) $40_1$ to $40_n$, an Interrogating Call Session Control Function (I-CSCF) 50, and Serving Call Session Control Functions (S-CSCFs) $60_1$ to $60_n$. The mobile communication network further includes a Home Subscriber Server (HSS) 30 that is a server that manages subscriber information, authentication information, billing information, and the like. In the subscriber information managed in the HSS 30, for each of the subscribers, information about an S-CSCF that serves as a storing destination for the subscriber is specified.

The SIP is used as a protocol for controlling the communication among the terminals $10_1$ to $10_n$, the P-CSCFs $40_1$ to $40_n$, the I-CSCF 50, and the S-CSCFs $60_1$ to $60_n$. The SIP is one of the communication control protocols that are used for internet phones and the like. With the SIP, sessions are generated, changed, and discontinued among the terminals. The DIAMETER is used as a protocol for controlling the communication among the I-CSCF 50, the S-CSCFs $60_1$ to $60_n$, and the HSS 30. The DIAMETER is one of the authentication protocols that are used for performing a user authentication process in a remote access.

The P-CSCFs $40_1$ to $40_n$ are SIP servers, and the terminals $10_1$ to $10_n$ make access first to one of the P-CSCFs $40_1$ to $40_n$. The P-CSCF $40_1$ to $40_n$ forward SIP messages received from the terminals $10_1$ to $10_n$ to the I-CSCF 50 or one of the S-CSCFs $60_1$ to $60_n$. When a P-CSCF from among the P-CSCFs $40_1$ to $40_n$ receives an SIP message from a terminal from among the terminals $10_1$ to $10_n$ for registering the current position of the terminal (hereinafter, a "registration request message"), that P-CSCF forwards the registration request message to the I-CSCF 50.

The I-CSCF 50 is an SIP server that receive a registration request transmitted from a terminal of a subscriber and making connections to home networks (the networks that are owned by communication carriers, and each home network corresponds to one communication carrier or one type of service) and other networks. Although only one I-CSCF, i.e., the I-CSCF 50, is shown in FIG. 6, generally, one I-CSCF 50 is provided for every home network. When the I-CSCF 50 receives a registration request message from any of the P-CSCFs $40_1$ to $40_n$, the I-CSCF 50 selects one of the S-CSCFs, based on storing S-CSCF information, which is defined for each of the subscribers and is included in the subscriber information managed in the HSS 30, and forwards the registration request message to the selected S-CSCF. If no storing S-CSCF information exists in the HSS 30, the I-CSCF 50 selects one of the S-CSCFs on its own, using a predetermined method.

The S-CSCFs $60_1$ to $60_n$ are SIP servers that perform user authentication processes and manage sessions, for example. The S-CSCFs $60_1$ to $60_n$ offer various kinds of multimedia services in collaboration with the application servers $20_1$ to $20_n$ based on the subscriber information managed in the HSS 30. When a S-CSCF from among the S-CSCFs $60_1$ to $60_n$ receives a registration request message from the I-CSCF 50, that S-CSCF performs a user authentication process for the subscriber who has transmitted the registration request message, and subsequently generates a session.

To summarize, when a terminal transmits a registration request message, a P-CSCF forwards the message to a I-CSCF. Further, the I-CSCF forwards the message to a S-CSCFs based on subscriber information managed in a HSS. Then, the S-CSCF performs a user authentication process for the subscriber based on the registration request message and also establishes a session.

Thus, in the conventional IMS network, the signals transmitted from the terminals are concentrated in the I-CSCF, which is provided only one for every home network. Thus, depending on the number of the signals, a huge amount of load can be put on the I-CSCF and cause some sort of problems. Therefore, there is a need of a technology that can reduce the load on the I-CSCF.

SUMMARY OF THE INVENTION

It is an object of the present invention to at least partially solve the problems in the conventional technology.

According to an aspect of the present invention, a call controlling apparatus that performs a call controlling processing on a call: based on a control signal transmitted from a terminal in a mobile communication network, includes a storing destination selecting unit that receives the control signal directed by a signal distributing device that directs a control signal to one of a plurality of call controlling apparatuses and forwards the control signal to one of the call controlling apparatuses that serves as a storing destination, which is specified for each subscriber in advance; and a session controlling unit that receives a control signal from one of the storing destination selecting unit and another storing destination selecting unit included in another call controlling apparatus and based on the control signal controls a session of the terminal.

According to another aspect of the present invention, a call controlling method used by a call controlling server apparatus that performs a call controlling processing on a call based on a control signal transmitted from a terminal in a mobile communication network, includes directing including a signal distributing device directing a control signal to one of a plurality of call controlling server apparatuses; first receiving including the call controlling server apparatus receiving the control signal directed at the directing and forwarding received control signal to one of the call controlling server apparatuses that serves as a storing destination, which is specified for each subscriber in advance; and second receiving including the call controlling server apparatus receiving a control signal forwarded from one of the forwarding and forwarding performed by another call controlling server apparatus and based on the control signal controlling a session of the terminal.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention will be explained in detail, with reference to the accompanied drawings.

Figure 1:
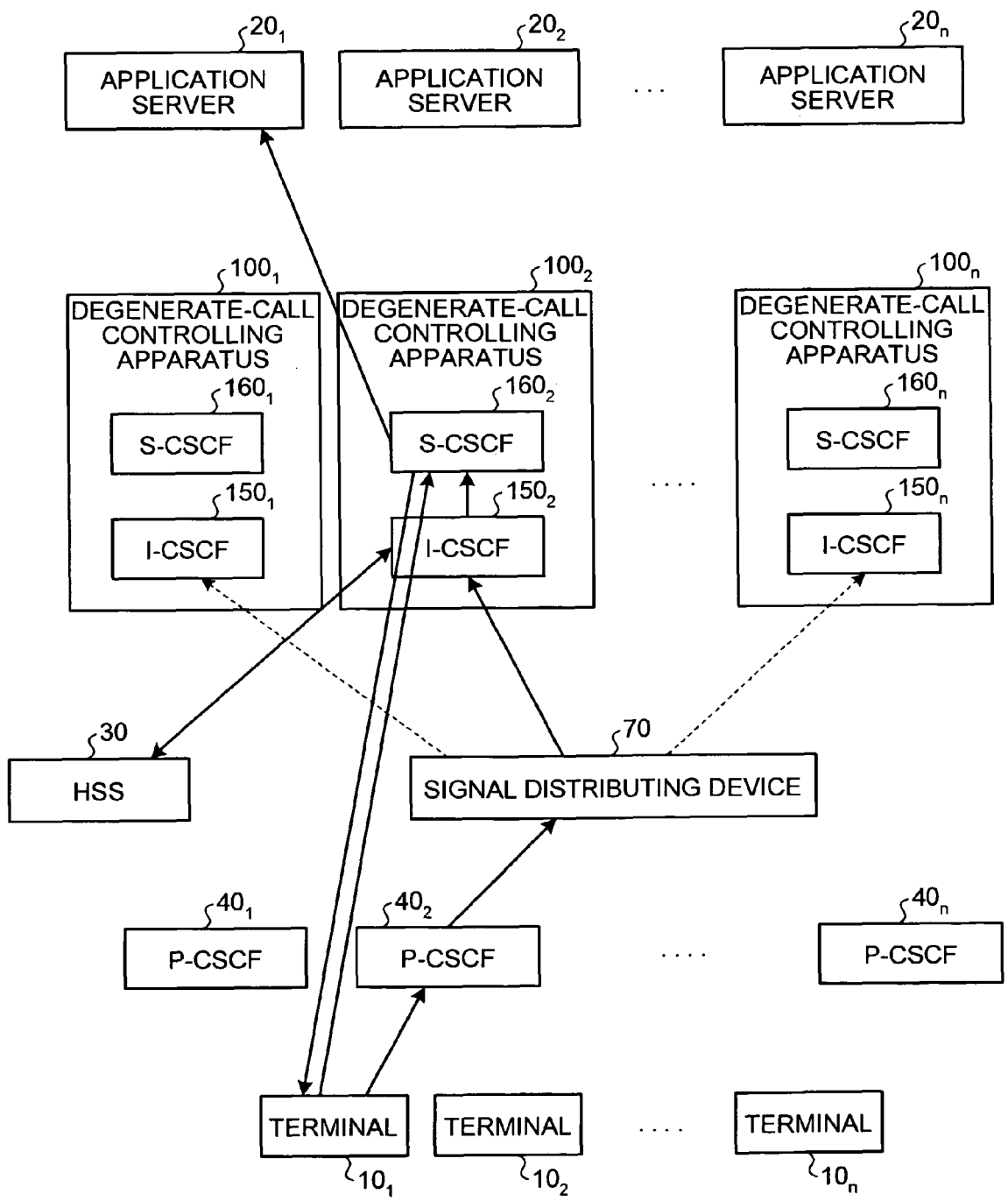
FIG. 1 is a block diagram of a mobile communication network according to a first embodiment of the invention.

FIG. 1 is a block diagram of a mobile communication network according to a first embodiment of the present invention. The mobile communication network includes n (where n is a positive integer) P-CSCFs $40_1$ to $40_n$, a signal distributing device 70, n degenerate-call controlling apparatuses $100_1$ to $100_n$, and an HSS 30. The P-CSCFs $40_1$ to $40_n$ are SIP servers, and the HSS 30 is a server that manages subscriber information.

The mobile communication network also includes the terminals $10_1$ to $10_n$ such as mobile phones, and the application servers $20_1$ to $20_n$. Subscribers use the terminals $10_1$ to $10_n$ to enjoy various kinds of multimedia services including telephone call services that are offered by a communication carrier through the application servers $20_1$ to $20_n$ by establishing sessions via the P-CSCFs $40_1$ to $40_n$, the signal distributing device 70, and the degenerate-call controlling apparatuses $100_1$ to $100_n$.

The SIP can be used as a communication control protocol for controlling the communication among the terminals $10_1$ to $10_n$, the P-CSCFs $40_1$ to $40_n$, the signal distributing device 70, and the degenerate-call controlling apparatuses $100_1$ to $100_n$. When a subscriber wants to use a service, he uses his own terminal to transmit an SIP message for registering the current position of his terminal (hereinafter, a "registration request message") to a fixed message transmission destination from among the P-CSCFs $40_1$ to $40_n$. A message transmission destination is specified in advance for each terminal of each subscriber. Accordingly, a session is established between a terminal of the subscriber and a degenerate-call controlling apparatus via a P-CSCF and the signal distributing device 70.

The mobile communication network further includes the HSS 30 that manages subscriber information, authentication information, billing information, and the like. The subscriber information includes, for each of the subscribers, storing destination information (for example, an IP address) indicating a degenerate-call controlling apparatus defined as the storing destination for the subscriber. Each of the degenerate-call controlling apparatuses $100_1$ to $100_n$ performs selection of a degenerate-call controlling apparatuses and authentication processes for the subscribers by referring to the subscriber information and the authentication information managed in the HSS 30. For example, the DIAMETER can be used as a communication control protocol for controlling the communication between the degenerate-call controlling apparatuses $100_1$ to $100_n$ and the HSS 30.

The P-CSCFs $40_1$ to $40_n$ are SIP servers to which the terminals $10_1$ to $10_n$ make access first. The P-CSCFs $40_1$ to $40_n$ forward SIP messages transmitted from the terminals $10_1$ to $10_n$ to various locations within the network. When one of the P-CSCFs $40_1$ to $40_n$ has received a registration request message from one of the terminals $10_1$ to $10_n$, that P-CSCF forwards the registration request message to the signal distributing device 70.

The signal distributing device 70 is a device that distributes each of the SIP messages received from the P-CSCFs $40_1$ to $40_n$ to one of the degenerate-call controlling apparatuses $100_1$ to $100_n$. To be more specific, when having received a registration request message from one of the P-CSCFs $40_1$ to $40_n$, the signal distributing device 70 selects one of the degenerate-call controlling apparatuses $100_1$ to $100_n$, using a predetermined method (for example, a round-robin method or a session number monitoring method) and forwards the registration request message to the selected degenerate-call controlling apparatus.

In this process, the signal distributing device 70 brings a Call-ID included in the header of the registration request messages into correspondence with the IP address of the one of the degenerate-call controlling apparatuses $100_1$ to $100_n$. The signal distributing device 70 stores therein the correspondence information for each of the Call-IDs as signal distribution information. Thereafter, when an SIP message is received from the same terminal again, the signal distributing device 70 forwards the SIP message to a corresponding one of the degenerate-call controlling apparatuses $100_1$ to $100_n$, based on the stored signal distribution information. With this arrangement, SIP messages that have identical Call-IDs, i.e. SIP messages in the same session or SIP messages in the same transaction, are forwarded to the same degenerate-call controlling apparatus.

Also, when forwarding the registration request message, the signal distributing device 70 performs a processing of changing the address values specified as the transmission source Media Access Control (MAC) address, the transmission destination MAC address (which are contained in the Ether header portion), and also the transmission source IP address and the transmission destination IP address (which are contained in the IP header) that are appended to the registration request message. To be more specific, the MAC address of the terminal from which the registration request message has been transmitted, the MAC address of the signal distributing device, the IP address of the terminal from which the registration request message has been transmitted, and the degenerate-call controlling apparatus representative address are specified as the transmission source MAC address, the transmission destination MAC address, the transmission source IP address, and the transmission destination IP address that are appended to the registration request message, respectively. In this situation, the degenerate-call controlling apparatus representative address is a virtual IP address that is designated in advance for the signal distributing device 70 and is recognized by each and all of the P-CSCFs $40_1$ to $40_n$ as the transmission destination to be specified when a registration request message is to be forwarded. The signal distributing device 70 changes these addresses to the MAC address of the signal distributing device, the MAC address of the degenerate-call controlling apparatus selected in the distribution processing, the IP address of the terminal from which the registration request message has been transmitted, and the IP address of the degenerate-call controlling apparatus selected in the distribution processing, respectively, and forwards the registration request message to the selected degenerate-call controlling apparatus.

As explained above, as for the transmission destination IP address for the message, because the signal distributing device 70 automatically replaces the degenerate-call controlling apparatus representative address with the IP address of the selected degenerate-call controlling apparatus, there is no need to change the forwarding destinations specified in the P-CSCFs $40_1$ to $40_n$, even if a new degenerate-call controlling apparatus is added to the network. Thus, it is possible to distribute and balance the loads from the locations in the network where signals are concentrated and also to save effort.

Each of the degenerate-call controlling apparatuses $100_1$ to $100_n$ is an apparatus that makes connections to the home networks that are owned by communication carriers and other networks, performs user authentication processes, and manages sessions, and includes a different one of I-CSCFs $150_1$ to $150_n$ and a different one of S-CSCFs $160_1$ to $160_n$.

Each of the I-CSCFs $150_1$ to $150_n$ is a processing unit that receives registration requests transmitted from the terminals of the subscribers and makes connections to the home networks (the networks that are owned by the communication carriers, and each home network corresponds to one communication carrier or one type of service) and other networks. When one of the I-CSCFs $150_1$ to $150_n$ receives a registration request message, the I-CSCF selects one of the S-CSCFs $160_1$ to $160_n$, based on the storing S-CSCF information included in the subscriber information managed in the HSS 30 and forwards the registration request message to the selected S-CSCF. In this situation, when no storing destination information is specified in the information of the subscriber who has requested the registration, the one of the I-CSCFs $150_1$ to $150_n$ selects an S-CSCF that is included in the same degenerate-call controlling apparatus and forwards the registration request message to the selected S-CSCF. For example, the I-CSCF $150_2$ included in the degenerate-call controlling apparatus $100_2$ selects the S-CSCF $160_2$ and internally forwards the registration request message to the S-CSCF $160_2$.

As explained above, when no S-CSCF is specified in the HSS 30 as a storing destination for the subscriber who has transmitted a signal from one of the terminals $10_1$ to $10_n$, the one of the I-CSCFs $150_1$ to $150_n$ internally forwards the signal to the S-CSCF included in the same degenerate-call controlling apparatus. Accordingly, even if no storing destination information is specified in the HSS 30 in advance, it is possible to automatically distribute and balance the loads efficiently and to distribute signals to the storing destinations. Thus, it is possible to distribute and balance the loads from the locations in the network where signals are concentrated.

Each of the S-CSCFs $160_1$ to $160_1$ is a processing unit that performs user authentication processes and manages sessions, for example. The S-CSCFs $160_1$ to $160_n$ offer various kinds of multimedia services in collaboration with the application servers $20_1$ to $20_n$, based on the subscriber information managed in the HSS 30. When one of the S-CSCFs $160_1$ to $160_n$ has received a registration request message from one of the I-CSCFs $150_1$ to $150_n$, the S-CSCF performs a user authentication process for the subscriber who has transmitted the registration request message, based on the subscriber information managed in the HSS 30.

In this situation, if no storing destination information is specified in the subscriber information that is of the subscriber and is managed in the HSS 30, in other words, if the one of the I-CSCFs $150_1$ to $150_n$ has selected the S-CSCF that is included in the same degenerate-call controlling apparatus, the one of the S-CSCFs $160_1$ to $160_n$ temporarily registers information (e.g. an IP address) indicating the degenerate-call controlling apparatus that includes the S-CSCF itself into the HSS 30, as the storing destination information for the subscriber, and also transmits, as a response, an access restriction message (a "401 Unauthorized" message) indicating that a user authentication process is required, to the terminal that has transmitted the registration request message.

At the time when the one of the S-CSCFs $160_1$ to $160_n$ receives a registration request message that is re-transmitted from the terminal in response to the access restriction message, the one of the S-CSCFs $160_1$ to $160_n$ formally registers the storing destination information into the HSS 30 and transmits, as a response, a successful request message (a "200 OK" message) indicating that the request was successful to the terminal that has transmitted the registration request message. In this situation, the one of the S-CSCFs $160_1$ to $160_n$ transmits the IP address of the one of the degenerate-call controlling apparatuses $100_1$ to $100_n$ that includes the S-CSCF itself by appending the IP address to the successful request message. For example, the S-CSCF $160_2$ transmits the IP address of the degenerate-call controlling apparatus $100_2$ that includes the S-CSCF $160_2$ itself by putting the IP address into the service-route header of the successful request message.

As explained above, when one of the S-CSCFs $160_1$ to $160_n$ transmits a response to indicate that a registration has been successful, in response to a registration request message transmitted from one of the terminals $10_1$ to $10_n$ to register the position information, the S-CSCF transmits the IP address of the degenerate-call controlling apparatus to the one of the terminals $10_1$ to $10_n$ so as to make it possible for the one of the terminals $10_1$ to $10_n$ to make direct access without going through the signal distributing apparatus 70. Thereafter, the one of the terminals $10_1$ to $10_n$ is able to transmit a message directly to the one of the S-CSCFs $160_1$ to $160_n$ included in the degenerate-call controlling apparatuses $100_1$ to $100_n$ without going through the signal distributing device 70. Accordingly, the amount of signals flowing into the signal distributing device 70 is reduced. Thus, it is possible to distribute and balance the loads from the locations in the network where signals are concentrated.

Figure 2:
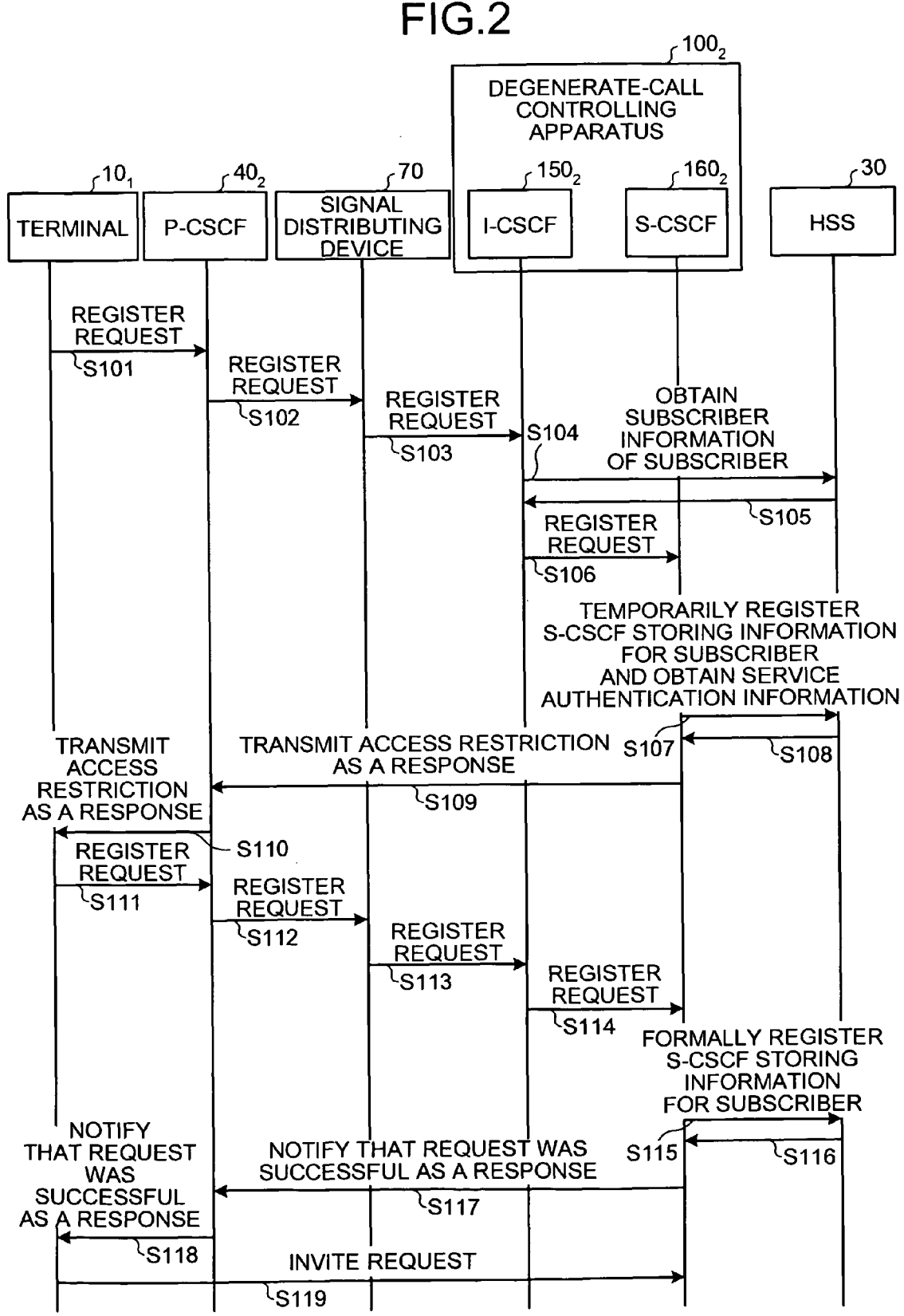
FIG. 2 is a sequence chart for explaining a terminal registration procedure performed in the mobile communication network shown in FIG. 1.

Next, the procedure for registering terminals in the mobile communication network according to the first embodiment will be explained. FIG. 2 is a sequence chart for explaining the terminal registration procedure used in the mobile communication network according to the first embodiment. As shown in the drawing, for example, when a REGISTER request (i.e. a terminal registration request) message is transmitted from the terminal $10_1$ by a subscriber to the network service (step S101), the P-CSCF that is specified as a message transmission destination for the terminal $10_1$, for example P-CSCF $40_2$, receives the REGISTER request message and forwards the message to the signal distributing device 70 (step S102).

The signal distributing device 70 stores therein a Call-ID included in the received REGISTER request message and also changes the address information appended to the REGISTER request message. The signal distributing device 70 also selects one of the degenerate-call controlling apparatuses using a predetermined method (for example, a round-robin method or a session number monitoring method), and forwards the REGISTER request message to the selected degenerate-call controlling apparatus, e.g. the degenerate-call controlling apparatus $100_2$ (step S103).

When the degenerate-call controlling apparatus $100_2$ has received the REGISTER request message, the I-CSCF $150_2$ obtains the subscriber information of the subscriber from the HSS 30 (steps S104 and S105). When no storing destination information is specified in the subscriber information of the subscriber, the I-CSCF $150_2$ internally forwards the REGISTER request message to the S-CSCF $160_2$, which is included in the same degenerate-call controlling apparatus $100_2$ (step S106).

When no storing destination information is specified in the subscriber information of the subscriber, the S-CSCF $160_2$ temporarily registers information (for example, the IP address) indicating the S-CSCF $160_2$ itself into the subscriber information of the subscriber managed in the HSS 30, as storing destination information (steps S107 and S108). At this time, the S-CSCF $160_2$ transmits, as a response, an access restriction message (a "401 Unauthorized" message) indicating that a user authentication process is required to the terminal $10_1$, via the P-CSCF $40_2$ (steps S109 and S110).

When having received the access restriction message, the terminal $10_1$ re-transmits a REGISTER request message and makes another attempt for registration (Step S111). The REGISTER request message in the re-transmission reaches the S-CSCF $160_2$ via the P-CSCF $40_2$, the signal distributing device 70, and the I-CSCF $150_2$ included in the degenerate-call controlling apparatus $100_2$, like in the first transmission. (steps S112, S113, and S114).

The S-CSCF $160_2$ performs a user authentication process for the subscriber, based on the REGISTER request message and also formally registers the information (for example, the IP address) indicating the degenerate-call controlling apparatus 1002 that includes the S-CSCF $160_2$ itself into the subscriber information of the subscriber managed in the HSS 30, as the storing destination information (steps S115 and S116). Further, the S-CSCF $160_2$ transmits, as a response, a successful request message (i.e. a "200 OK" message) indicating that the request was successful to the terminal $10_1$ via the P-CSCF $40_2$ (steps S117 and S118). At this time, the S-CSCF $160_2$ transmits the IP address of the degenerate-call controlling apparatus 1002 that includes the S-CSCF $160_2$ itself by appending the IP address to the successful request message. For example, the S-CSCF $160_2$ transmits the IP address of the degenerate-call controlling apparatus 1002 that includes the S-CSCF $160_2$ itself by putting the IP address into the service-route header of the successful request message (step S117).

When having received the successful request message, the terminal $10_1$ transmits an INVITE request message for requesting that a communication party should be called, directly to the S-CSCF $160_2$, using the IP address of the S-CSCF $160_2$ appended to the successful request message (step S119). Thereafter, when the terminal $10_1$ needs to make a request to the S-CSCF $160_2$, the terminal $10_1$ transmits a request message directly to the S-CSCF $160_2$ without going through the P-CSCF $40_2$, the signal distributing device 70, and the I-CSCF $150_2$ included in the degenerate-call controlling apparatus $100_2$.

As explained above, each of the signals transmitted from one of the terminals $10_1$ to $10_n$ to one of the P-CSCF $40_1$ to $40_n$ is forwarded to the signal distributing device 70 so that the signal distributing device 70 distributes the signal to one of the I-CSCFs $150_1$ to $150_n$. Then, the one of the I-CSCFs $150_1$ to $150_n$ internally forwards the signal to one of the S-CSCFs $160_1$ to $160_n$. Thus, it is possible to perform the call controlling processing while the signals that may be otherwise concentrated in the I-CSCFs are distributed and balanced.

As explained so far, according to the first embodiment, an I-CSCF and an S-CSCF are included in a single call controlling apparatus in a degenerate manner. A message forwarded from the signal distributing device 70 that distributes each of the messages transmitted from the terminals $10_1$ to $10_n$ to one of the plurality of degenerate-call controlling apparatuses $100_1$ to $100_n$ is forwarded by one of the I-CSCFs $150_1$ to $150_n$ to an S-CSCF that serves as a storing destination, which is specified for each subscriber in advance, or is forwarded to, if no S-CSCF is specified as the storing destination for the subscriber, an S-CSCF that is selected using a predetermined method. Each of the I-CSCFs $150_1$ to $150_n$ is configured to receive a message that has been forwarded from the same call controlling apparatus or another call controlling apparatus and to control sessions of the terminals $10_1$ to $10_n$, based on the received messages. With this arrangement, it is possible to process the messages transmitted from the terminals $10_1$ to $10_n$ by distributing the messages to corresponding ones of the I-CSCFs $150_1$ to $150_n$ included in the degenerate-call controlling apparatuses $100_1$ to $100_n$. Thus, it is possible to distribute and balance the loads from the locations in the network where signals are concentrated.

In the description of the first embodiment, an example is explained in which an I-CSCF and an S-CSCF are included, in a degenerate manner, in a single degenerate-call controlling apparatus, and also the signals forwarded from the P-CSCFs are distributed to corresponding ones of a plurality of degenerate-call controlling apparatuses, using the signal distributing device, so that the loads that may be otherwise concentrated in the I-CSCFs are distributed and balanced. Further, it is also possible to distribute and balance the loads of the P-CSCFs by having another arrangement in which an P-CSCF is also included in each degenerate-call controlling apparatus in a degenerate manner, and the signals transmitted from the terminals to the P-CSCFs are distributed to corresponding ones of the degenerate-call controlling apparatuses, using a signal distributing device. In the description of a second embodiment of the invention, an example in which a P-CSCF, an I-CSCF, and an S-CSCF are included, in a degenerate manner, in a single degenerate-call controlling apparatus will be explained.

Figure 3:
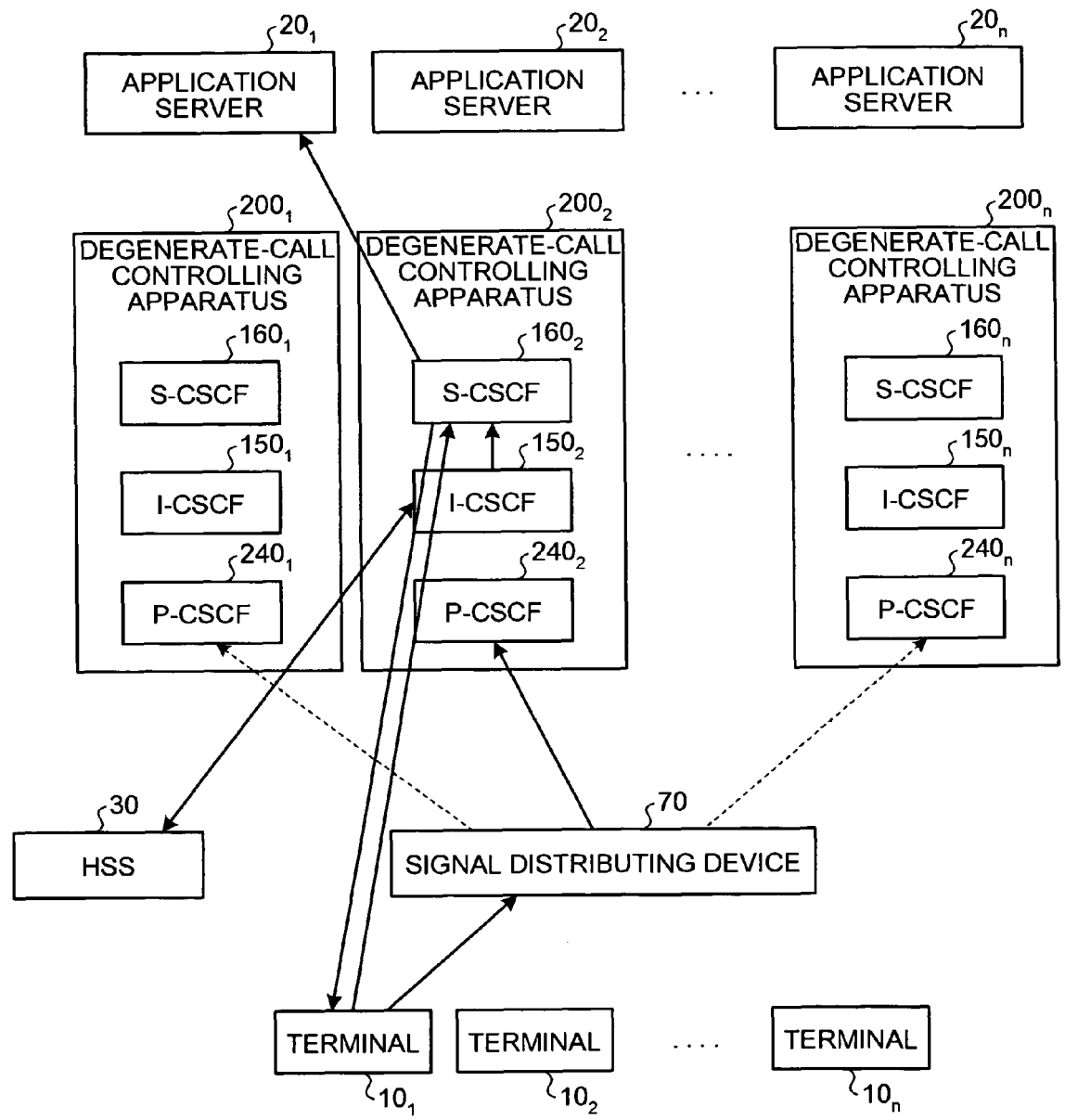
FIG. 3 is a block diagram of a mobile communication network according to a second embodiment of the invention.

FIG. 3 is a block diagram of a mobile communication network according to a second embodiment of the present invention. In the following description, for the sake of convenience of explanation, the functional elements that play the same roles as the constituent elements shown in FIG. 1 are referred to by using the same reference characters, and detailed explanation thereof will be omitted. As shown in the drawing, the mobile communication network includes the signal distributing device 70, degenerate-call controlling apparatuses $200_1$ to $200_n$, and the HSS 30 that is a server that manages the subscriber information.

In FIG. 3, the terminals $10_1$ to $10_n$ are mobile terminals like mobile phones. Using the terminals $10_1$ to $10_n$, the subscribers to the network service (hereinafter, "subscribers") are able to use various kinds of multimedia services including telephone call services that are offered by a communication carrier through the application servers $20_1$ to $20_n$ by establishing sessions via the signal distributing device 70 and the degenerate-call controlling apparatuses $200_1$ to $200_n$.

For example, the SIP may be used as a communication control protocol for controlling the communication among the terminals $10_1$ to $10_n$, the signal distributing device 70, and the degenerate-call controlling apparatuses $200_1$ to $200_n$. When using a service, each subscriber transmits an SIP message for registering the current position (hereinafter, a "registration request message") from the terminal that the subscriber owns to the message transmission destination that is specified in advance for each terminal, the message transmission destination being the signal distributing device 70 according to the second embodiment. Accordingly, sessions are established via the signal distributing device 70 and the degenerate-call controlling apparatuses $200_1$ to $200_n$.

The HSS 30 is a server that manages subscriber information, authentication information, billing information, and the like. The subscriber information managed in the HSS 30 includes storing destination information (for example, an IP address) indicating a degenerate-call controlling apparatus that serves as a storing destination, which is specified for each subscriber. Each of the degenerate-call controlling apparatuses $200_1$ to $200_n$ selects one of the degenerate-call controlling apparatuses and performs user authentication processes for the subscribers by referring to the subscriber information and the authentication information managed in the HSS 30. For example, the DIAMETER is used as a communication control protocol for controlling the communication between the degenerate-call controlling apparatuses $200_1$ to $200_n$ and the HSS 30.

The signal distributing device 70 is a device that distributes each of the SIP messages received from the terminals $10_1$ to $10_n$ to one of the degenerate-call controlling apparatuses $200_1$ to $200_n$. To be more specific, when having received a registration request message from one of the terminals $10_1$ to $10_n$, the signal distributing device 70 selects one of the degenerate-call controlling apparatuses $200_1$ to $200_n$, using a predetermined method (for example, a round-robin method or a session number monitoring method) and forwards the registration request message to the selected degenerate-call controlling apparatus.

In this process, the signal distributing device 70 brings a Call-ID included in the header of the registration request messages into correspondence with the IP address of the one of the degenerate-call controlling apparatus $200_1$ to $200_n$. The signal distributing device 70 stores therein the correspondence information for each of the Call-IDs as signal distribution information. Thereafter, when an SIP message is received from the same terminal again, the signal distributing device 70 forwards the SIP message to a corresponding one of the degenerate-call controlling apparatuses $200_1$ to $200_n$, based on the stored signal distribution information. With this arrangement, SIP messages that have identical Call-IDs, i.e. SIP messages in the same session or SIP messages in the same transaction, are forwarded to the same degenerate-call controlling apparatus.

Also, when forwarding the registration request message, the signal distributing device 70 performs a processing of changing the address values specified as the transmission source MAC address, the transmission destination MAC address (which are contained in the Ether header portion), and also the transmission source IP address and the transmission destination IP address (which are contained in the IP header) that are appended to the registration request message. To be more specific, the MAC address of the terminal from which the registration request message has been transmitted, the MAC address of the signal distributing device, the IP address of the terminal from which the registration request message has been transmitted, and the degenerate-call controlling apparatus representative address are specified as the transmission source MAC address, the transmission destination MAC address, the transmission source IP address, and the transmission destination IP address that are appended to the registration request message, respectively. In this situation, the degenerate-call controlling apparatus representative address is a virtual IP address that is designated in advance for the signal distributing device 70 and is recognized by each and all of the terminals $10_1$ to $10_n$ as the transmission destination to be specified when a registration request message is to be transmitted. The signal distributing device 70 changes these addresses to the MAC address of the signal distributing device, the MAC address of the degenerate-call controlling apparatus selected in the distribution processing, the IP address of the terminal from which the registration request message has been transmitted, and the IP address of the degenerate-call controlling apparatus selected in the distribution processing, respectively, and forwards the registration request message to the selected degenerate-call controlling apparatus.

Each of the degenerate-call controlling apparatuses $200_1$ to $200_n$ is an apparatus that receives SIP messages transmitted from the terminals $10_1$ to $10_n$, makes connections to the home networks that are owned by communication carriers and other networks, performs user authentication processes, and manages sessions, and includes a different one of P-CSCFs $240_1$ to $240_n$, a different one of I-CSCFs $150_1$ to $150_n$, and a different one of S-CSCFs $160_1$ to $160_n$.

Each of the P-CSCFs $240_1$ to $240_n$ is a processing unit that receives SIP messages transmitted from the terminals $10_1$ to $10_n$ and forwards each of the SIP messages to one of the signal distributing device 70 and the degenerate-call controlling apparatuses $200_1$ to $200_n$. When one of the P-CSCFs $240_1$ to $240_n$ receives an SIP message (hereinafter, a registration request message) for registering the current position from one of the terminals $10_1$ to $10_n$, the P-CSCF forwards the registration request message to one of the I-CSCFs $150_1$ to $150_n$ that is included in the same degenerate-call controlling apparatus. For example, the P-CSCF $240_2$ included in the degenerate-call controlling apparatus $200_2$ forwards the registration request message to the I-CSCF $150_2$.

As explained above, with the arrangement in which each of the degenerate-call controlling apparatuses $200_1$ to $200_n$ further includes, in a degenerate manner, a different one of the P-CSCFs $240_1$ to $240_n$, so that the signals transmitted from the terminals to the P-CSCFs $240_1$ to $240_n$ are distributed to corresponding ones of the degenerate-call controlling apparatuses $200_1$ to $200_n$, using the signal distributing device 70, it is possible to distribute and balance the loads on the P-CSCFs.

Figure 4:
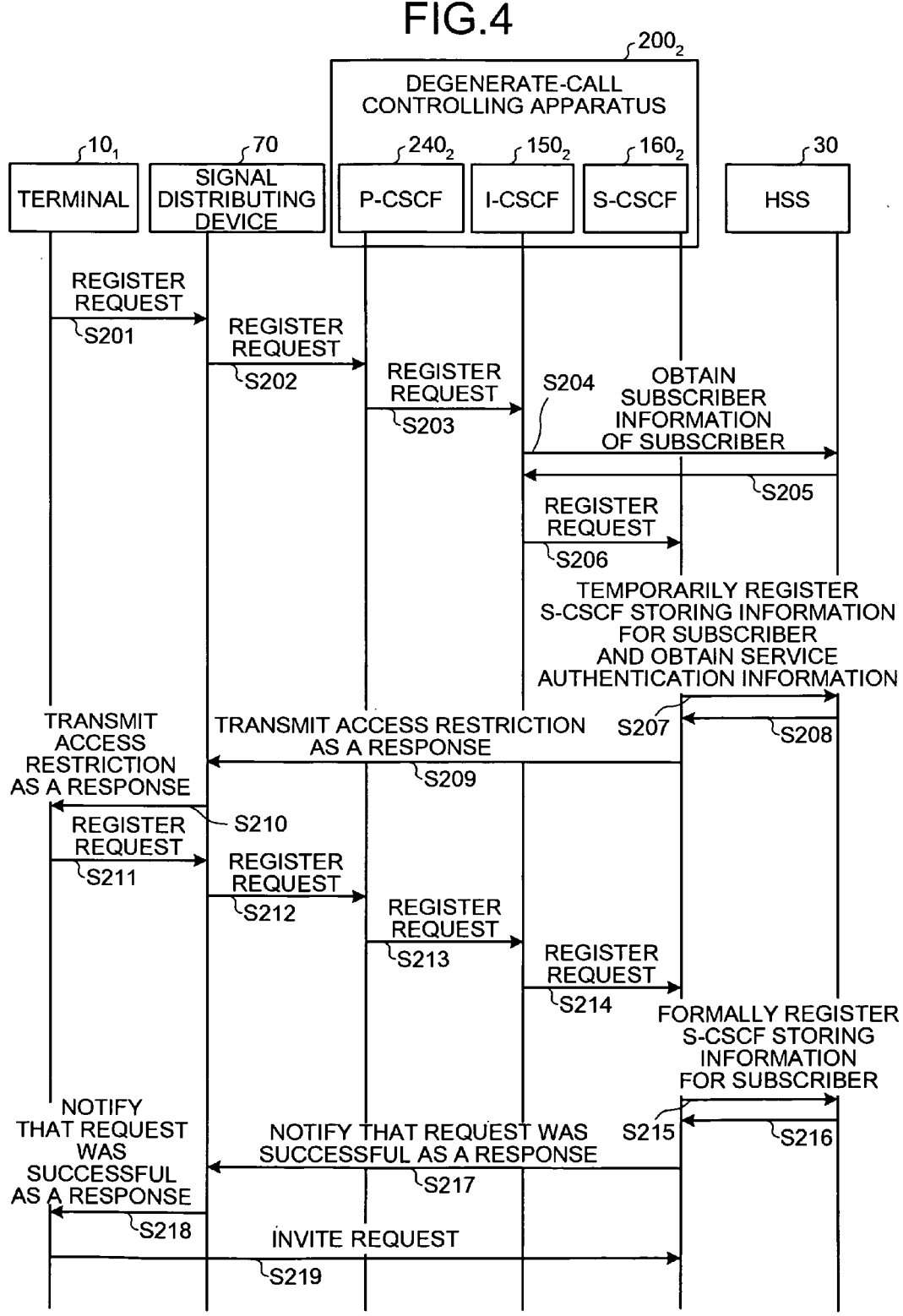
FIG. 4 is a sequence chart for explaining a terminal registration procedure performed in the mobile communication network shown in FIG. 3.

Next, the procedure for registering terminals in the mobile communication network according to the second embodiment will be explained. FIG. 4 is a sequence chart for explaining the terminal registration procedure used in the mobile communication network according to the second embodiment. As shown in the drawing, for example, when a REGISTER request (i.e. a terminal registration request) message is transmitted from the terminal $10_1$ by a subscriber to the network service, the signal distributing device 70, which is specified as a message transmission destination for the terminal $10_1$, receives the REGISTER request message (step S201).

The signal distributing device 70 stores therein a Call-ID included in the received REGISTER request message and also changes the address information appended to the REGISTER request message. The signal distributing device 70 also selects one of the degenerate-call controlling apparatuses, using a predetermined method (for example, a round-robin method or a session number monitoring method), and forwards the REGISTER request message to the selected degenerate-call controlling apparatus, e.g. the degenerate-call controlling apparatus $200_2$ (step S202).

When the degenerate-call controlling apparatus $200_2$ has received the REGISTER request message, the P-CSCF $240_2$ internally forwards the REGISTER request message to the I-CSCF $150_2$, which is included in the same degenerate-call controlling apparatus $200_2$ (step S203).

Subsequently, the I-CSCF $150_2$ obtains the subscriber information of the subscriber from the HSS 30 (steps S204 and S205). When no storing S-CSCF information is included in the subscriber information of the subscriber, the I-CSCF $150_2$ internally forwards the REGISTER request message to the S-CSCF $160_2$, which is included in the same degenerate-call controlling apparatus $200_2$ (step S206).

When no storing S-CSCF information is included in the subscriber information of the subscriber, the S-CSCF $160_2$ temporarily registers information (for example, the IP address) indicating the S-CSCF $160_2$ itself into the subscriber information of the subscriber managed in the HSS 30, as storing S-CSCF information (steps S207 and S208). At this time, the S-CSCF $160_2$ transmits, as a response, an access restriction message (a "401 Unauthorized" message) indicating that a user authentication process is required to the terminal $10_1$, via the P-CSCF $240_2$ (steps S209 and S210).

When having received the access restriction message, the terminal $10_1$ re-transmits a REGISTER request message and makes another attempt for registration (Step S211). The REGISTER request message in the re-transmission reaches the S-CSCF $160_2$ via the signal distributing device 70 and also the P-CSCF $240_2$ and the I-CSCF $150_2$ that are included in the degenerate-call controlling apparatus $200_2$, like in the first transmission (steps S212, S213, and S214).

The S-CSCF $160_2$ performs a user authentication process for the subscriber, based on the REGISTER request message and also formally registers the information (for example, the IP address) indicating the degenerate-call controlling apparatus $200_2$ that includes the S-CSCF $160_2$ itself into the subscriber information of the subscriber managed in the HSS 30, as the storing S-CSCF information (steps S215 and S216). Further, the S-CSCF $160_2$ transmits, as a response, a successful request message (i.e. a "200 OK" message) indicating that the request was successful to the terminal $10_1$ via the P-CSCF $240_2$ (steps S217 and S218). At this time, the S-CSCF $160_2$ transmits the IP address of the degenerate-call controlling apparatus $200_2$ that includes the S-CSCF $160_2$ itself by appending the IP address to the successful request message. For example, the S-CSCF $160_2$ transmits the IP address of the degenerate-call controlling apparatus $200_2$ that includes the S-CSCF $160_2$ itself by putting the IP address into the service-route header of the successful request message (step S217).

When having received the successful request message, the terminal $10_1$ transmits an INVITE request message for requesting that a communication party should be called, directly to the S-CSCF $160_2$, using the IP address of the S-CSCF $160_2$ appended to the successful request message (step S219). Thereafter, when the terminal $10_1$ needs to make a request to the S-CSCF $160_2$, the terminal $10_1$ transmits a request message directly to the S-CSCF $160_2$ without going through the P-CSCF $240_2$, the signal distributing device 70, and the I-CSCF $150_2$ included in the degenerate-call controlling apparatus $200_2$.

As explained above, each of the signals transmitted from the terminals $10_1$ to $10_n$ is distributed by the signal distributing device 70 to one of the P-CSCFs $240_1$ to $240_n$. Then, the one of the P-CSCFs $240_1$ to $240_n$ internally forwards the signal to the one of the I-CSCFs $150_1$ to $150_n$ included in the same degenerate-call controlling apparatus. Further, the one of the I-CSCFs $150_1$ to $150_n$ internally forwards the signal to one of the S-CSCFs $160_1$ to $160_n$. Thus, it is possible to perform the call controlling processing while the signals that may be otherwise concentrated in the P-CSCFs are distributed and balanced.

As explained so far, according to the second embodiment, each of the P-CSCFs $240_1$ to $240_n$ is further included in a respective call controlling apparatus in a degenerate manner. Also, each of the P-CSCFs $240_1$ to $240_n$ receives a message distributed by the signal distributing device 70 and forwards the message to one of the I-CSCFs $150_1$ to $150_n$ that is included in the same call controlling apparatus. The one of the I-CSCFs $150_1$ to $150_n$ receives the forwarded message and further forwards the message to the S-CSCF that serves as the storing destination, which is specified for each subscriber in advance. With this arrangement, it is possible to process the messages transmitted from the terminals $10_1$ to $10_n$ directly to the signal distributing device 70 by distributing the messages to corresponding ones of the P-CSCFs $240_1$ to $240_n$ included in the degenerate-call controlling apparatuses $200_1$ to $200_n$. Thus, it is possible to distribute and balance the loads from the locations in the network where signals are concentrated.

In the first and the second embodiments, the degenerate-call controlling apparatuses have been explained as hardware; however, the degenerate-call controlling apparatuses can be implemented with software. Specifically, a computer can be made to execute a computer program (hereinafter, "degenerate call controlling program") that can realize the same functions as any degenerate-call controlling apparatus.

Figure 5:
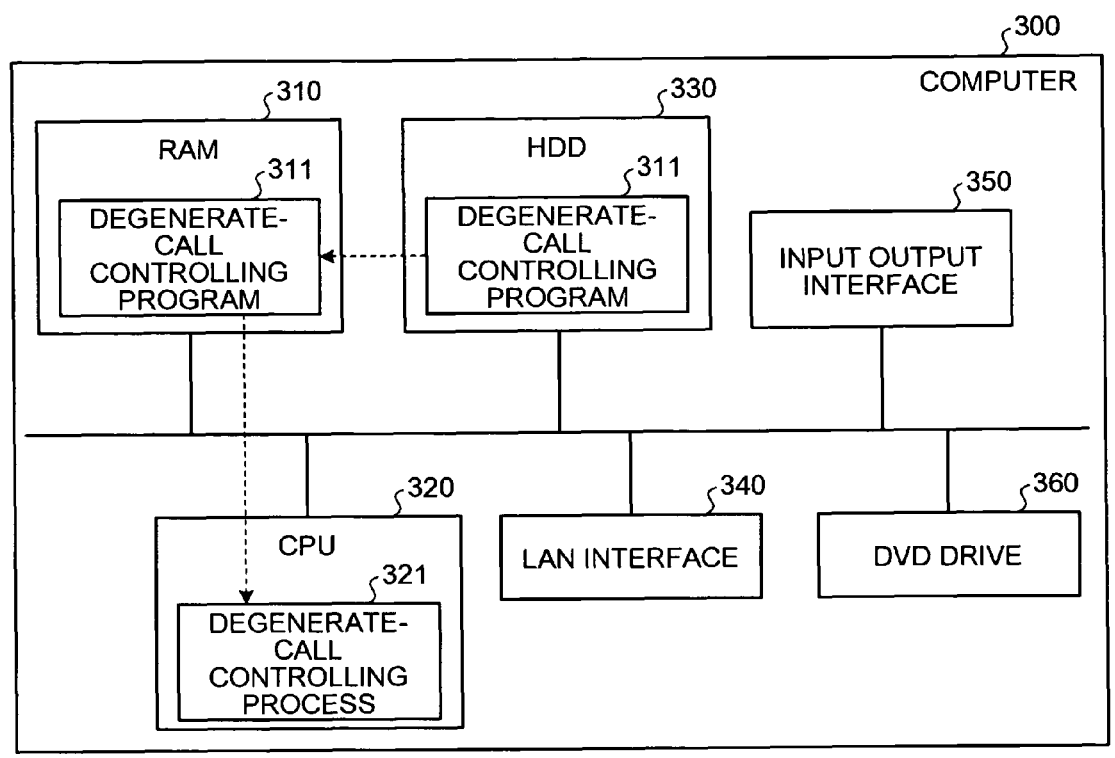
FIG. 5 is a functional block diagram of a computer that realizes the various processes according to the first and the second embodiments.
Figure 6:
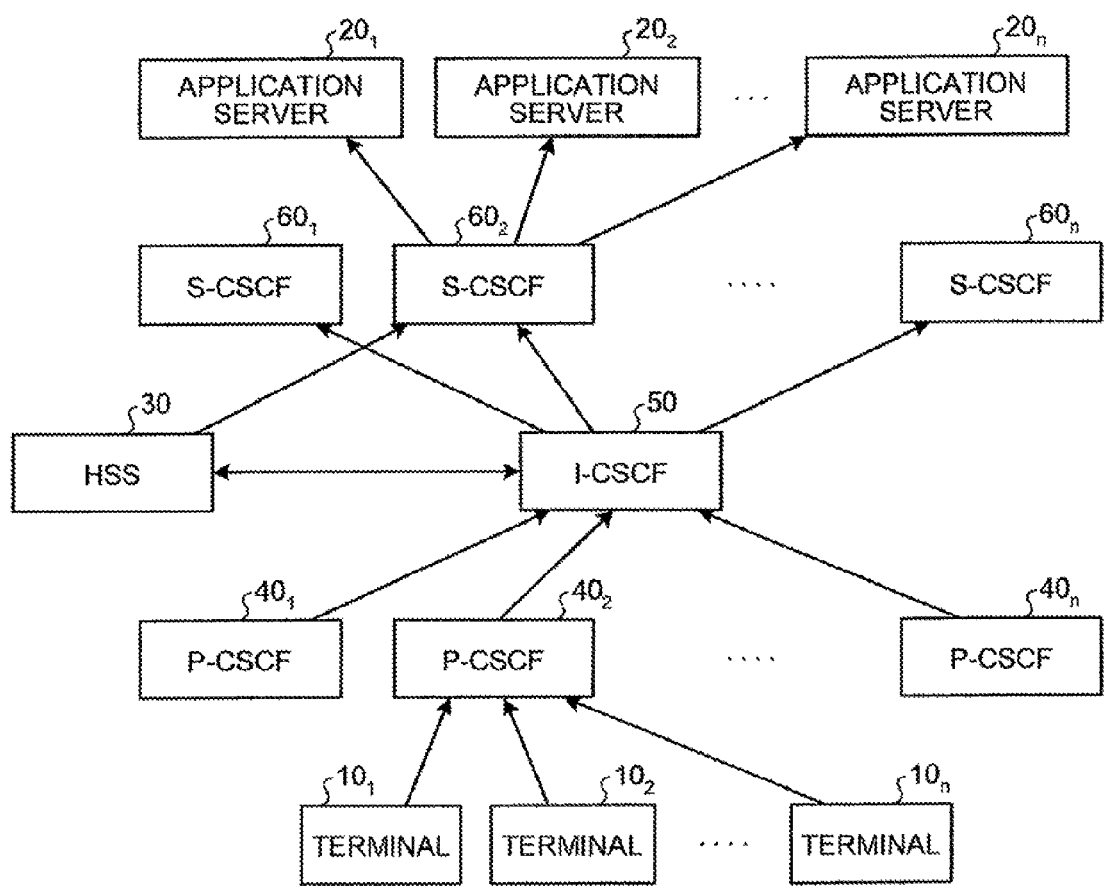
FIG. 6 is a block diagram of a typical mobile communication network defined by the IMS.

FIG. 5 is a functional block diagram of a computer 300 that executes the degenerate call controlling program according to the first and the second embodiments. The computer 300 includes a Random Access Memory (RAM) 310, a Central Processing Unit (CPU) 320, a Hard Disk Drive (HDD) 330, a Local Area Network (LAN) interface 340, an input output interface 350, and a Digital Versatile Disk (DVD) Drive 360.

The RAM 310 is a memory that stores therein programs and the results obtained during the execution of the programs. The CPU 320 is a central processing unit that reads a program from the RAM 310 and executes the read program.

The HDD 330 is a disc apparatus that stores therein programs and data. The LAN interface 340 is an interface for connecting the computer 300 to another computer via the LAN.

The input output interface 350 is an interface for connecting input devices such as a mouse and a keyboard and a display device. The DVD drive 360 is an apparatus for reading and writing data to and from a DVD.

The degenerate call controlling program 311 executed by the computer 300 is stored in a DVD, is read from the DVD by the DVD drive 360, and is installed onto the computer 300.

Alternatively, the degenerate call controlling program 311 may be stored in a database in another computer system connected via the LAN interface 340 and may be read from the data base so as to be installed onto the computer 300.

The degenerate call controlling program 311 installed on the computer 300 is stored into the HDD 330, is read into the RAM 310, and is executed by the CPU 320 as a degenerate call controlling process 321.

According to an aspect of the present invention, it is possible to distribute and balance the loads from the locations in the network where the signals are concentrated.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A call controlling apparatus that performs a call controlling processing on a call based on a control signal transmitted from a terminal in a mobile communication network, the call controlling apparatus comprising:
   a storing destination selecting unit that receives the control signal directed by a signal distributing device that directs a control signal to one of a plurality of call controlling apparatuses and forwards the control signal to one of the call controlling apparatuses that serves as a storing destination, which is specified for each subscriber in advance; and
   a session controlling unit that receives a control signal from one of the storing destination selecting unit and another storing destination selecting unit included in another call controlling apparatus and based on the control signal controls a session of the terminal, wherein
   the storing destination selecting unit forwards the control signal to the session controlling unit included in the call controlling apparatus, when no call controlling apparatus that serves as the storing destination is specified for a subscriber who has transmitted the control signal from the terminal, and
   the session controlling unit receives the control signal from the storing destination selecting unit, specifies the call controlling apparatus as the storing destination of the subscriber, and transmits address information of the call controlling apparatus to the terminal of the subscriber.

2. The call controlling apparatus according to claim 1, in a degenerate manner, further comprising:
   a terminal signal forwarding unit that receives the control signal distributed by the signal distributing device and forwards the control signal to the storing destination selecting unit included in the call controlling apparatus, wherein
   the storing destination selecting unit receives the control signal forwarded by the terminal signal forwarding unit and forwards the control signal to the one of the call controlling apparatuses that serves as the storing destination, which is specified for each subscriber in advance.

3. The call controlling apparatus according to claim 1, wherein
   the session controlling unit requires an authentication process to the terminal of the subscriber before specifying the call controlling apparatus as the storing destination of the subscriber.

4. The call controlling apparatus according to claim 3, wherein
   when the session controlling unit notifies that the authentication process has been successful, the session controlling unit transmits the address information to the terminal so as to make it possible for the terminal to make access, without going through the signal distributing device.

5. A call controlling method used by a call controlling server apparatus that performs a call controlling processing on a call based on a control signal transmitted from a terminal in a mobile communication network, the call controlling method comprising:
   directing, using a signal distributing device, a control signal to one of a plurality of call controlling server apparatuses, each of the call controlling server apparatuses including a storing destination selecting unit and a session controlling unit;
   receiving the control signal at a storing destination selecting unit included in a first call controlling server apparatus;
   forwarding, from the storing destination selecting unit, the received control signal to a session controlling unit included in one of the plurality of call controlling server apparatuses based on storing destination information, which is associated with a subscriber who has transmitted the control signal from the terminal; and
   forwarding, from the storing destination selecting unit, the received control signal to a session controlling unit included in the first call controlling server apparatus when no storing destination information is associated with the subscriber who has transmitted the control signal from the terminal.

6. The call controlling method according to claim 5, further comprising:
   performing, using the session controlling unit included in the first call controlling server, a registration process to associate an address of the first call controlling server apparatus with the subscriber when no storing destination information is associated with the subscriber who has transmitted the control signal from the terminal.

7. The call controlling method according to claim 6, wherein performing the registration process further comprises:
   performing an authentication process that provides an address of the call controlling server apparatus in which the session controlling unit is located to the terminal of the subscriber.

8. A non-transitory computer-readable recording medium that stores therein a computer program that causes a computer to performing a call controlling processing on a call based on a control signal transmitted from a terminal in a mobile communication network, the computer program causes the computer to execute:
   directing, using a signal distributing device, a control signal to one of a plurality of call controlling server apparatuses, each of the call controlling server apparatuses including a storing destination selecting unit and a session controlling unit;
   receiving the control signal at a storing destination selecting unit included in a first call controlling server apparatus;
   forwarding, from the storing destination selecting unit, the received control signal to a session controlling unit included in one of the plurality of call controlling server apparatuses based on storing destination information, which is associated with a subscriber who has transmitted the control signal from the terminal; and
   forwarding, from the storing destination selecting unit, the received control signal to a session controlling unit included in the first call controlling server apparatus when no storing destination information is associated with the subscriber who has transmitted the control signal from the terminal.

9. The non-transitory computer-readable recording medium according to claim 8, wherein the computer program further causes the computer to execute:

performing, using the session controlling unit included in the first call controlling server, a registration process to associate an address of the first call controlling server apparatus with the subscriber when no storing destination information is associated with the subscriber who has transmitted the control signal from the terminal.

10. The non-transitory computer-readable recording medium according to claim 8, wherein performing the registration process further comprises:

performing an authentication process that provides an address of the call controlling server apparatus in which the session controlling unit is located to the terminal of the subscriber.

* * * * *